(12) United States Patent
Jimenez de Castro Fernandez

(10) Patent No.: US 8,104,969 B2
(45) Date of Patent: Jan. 31, 2012

(54) MODULAR BEARING UNIT

(76) Inventor: Jose Luis Jimenez de Castro Fernandez, Talavera de la Reina (ES)

( * ) Notice: Subject to any disclaimer, the term of this patent is extended or adjusted under 35 U.S.C. 154(b) by 648 days.

(21) Appl. No.: 12/224,764

(22) PCT Filed: Mar. 6, 2006

(86) PCT No.: PCT/ES2006/000105
§ 371 (c)(1),
(2), (4) Date: Sep. 5, 2008

(87) PCT Pub. No.: WO2007/101890
PCT Pub. Date: Sep. 13, 2007

(65) Prior Publication Data
US 2009/0074340 A1   Mar. 19, 2009

(51) Int. Cl.
*F16C 33/58* (2006.01)
*F16C 19/02* (2006.01)
(52) U.S. Cl. .................. 384/461; 384/513; 384/540
(58) Field of Classification Search .................. 384/458, 384/461, 482, 512, 515, 517, 540, 545
See application file for complete search history.

(56) References Cited

U.S. PATENT DOCUMENTS

| | | | |
|---|---|---|---|
| 1,062,649 A | 5/1913 | Hess | |
| 1,769,933 A | 7/1930 | Arutunoff | |
| 2,481,146 A | 9/1949 | Palumbo | |
| 2,747,948 A * | 5/1956 | Jergens | 384/482 |
| 3,737,202 A | 6/1973 | Rosales | |
| 5,454,281 A * | 10/1995 | Chi | 384/540 |
| 5,632,561 A | 5/1997 | Chi | 384/458 |
| 5,826,898 A * | 10/1998 | Fortier et al. | 280/279 |
| 6,186,027 B1 * | 2/2001 | Nielsen | 74/551.1 |
| 6,302,589 B1 * | 10/2001 | Van Houtte | 384/545 |
| 2004/0126046 A1 * | 7/2004 | Chiang | 384/545 |
| 2005/0047697 A1 * | 3/2005 | Shao et al. | 384/540 |

FOREIGN PATENT DOCUMENTS

| | | |
|---|---|---|
| DE | 3618335 | 12/1986 |
| WO | WO 2004/111478 | 12/2004 |

* cited by examiner

*Primary Examiner* — Marcus Charles
(74) *Attorney, Agent, or Firm* — DLA Piper LLP (US)

(57) ABSTRACT

A modular bearing unit, including a plurality of bearings and bearing shells, wherein each bearing shell incorporates a main body, composed of two coaxial ball-races between which a ball ring, a coaxial neck, an external diameter of which matches an internal diameter of an interior cylindrical ring of the bearing shell, with a threaded surface, is established, so that each bearing shell can be coupled and fixed coaxially to another bearing shell through the threaded surface of the coaxial neck.

6 Claims, 1 Drawing Sheet

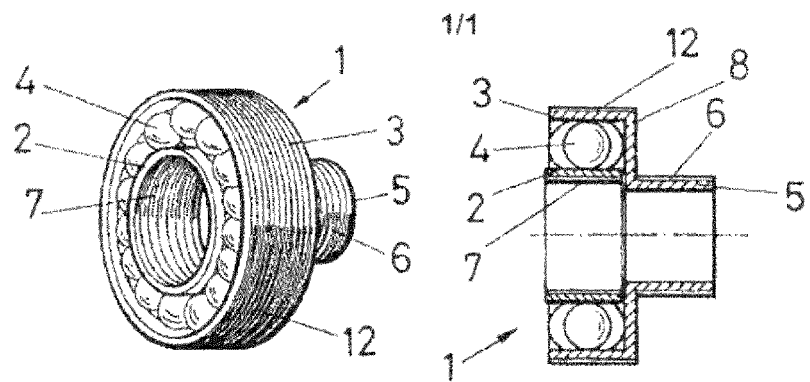
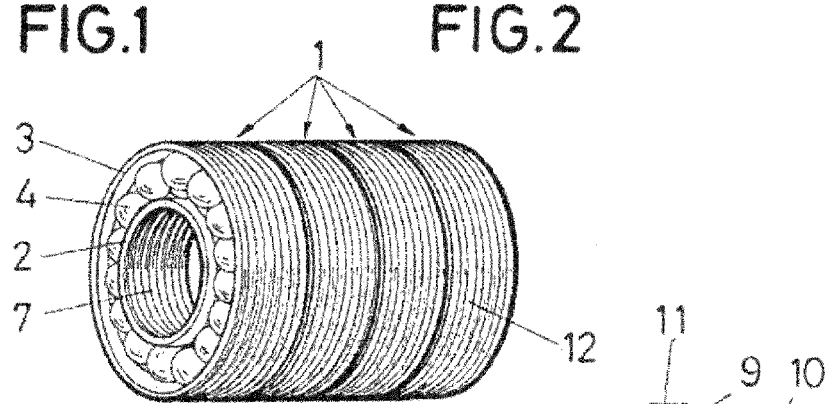
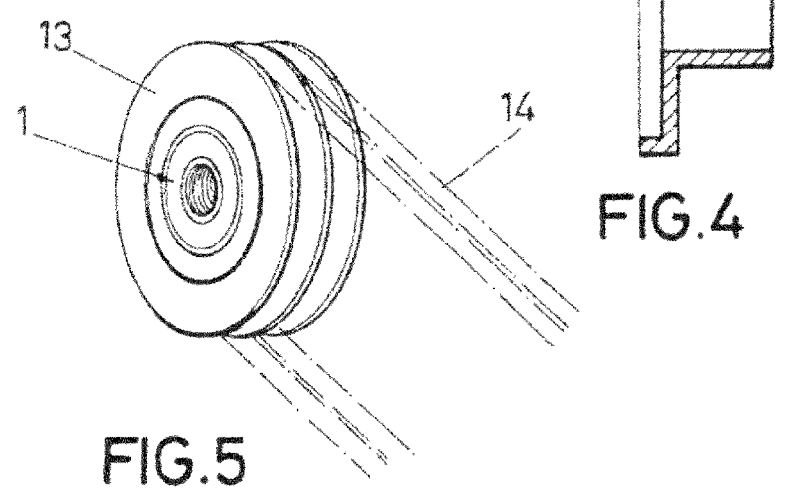

MODULAR BEARING UNIT

(I) CROSS REFERENCE TO RELATED APPLICATIONS

None

(II) BACKGROUND OF THE INVENTION (i) Field of Invention

This invention refers to a modular bearing unit that makes it possible to establish any number of bearings operating within the system, as desired, in accordance with the specific needs of each case. Its main purpose is to achieve a reducing effect of variable amplitude, in accordance with the number of bearings operating within the unit.

In addition, the purpose of this invention is to facilitate the coupling between the modules participating in the unit and the coupling of bearings to accessories in each specific case, such as gears, pulleys, etc.

(ii) Description of Related Art

As it is known, a bearing is composed of a bearing shell with two coaxial cylinders between which a ball or roller crown is inserted. The ball or roller crown can rotate freely so that the corresponding element is fixed to the internal cylinder, such as, for example, an axis, while the element that rotates on the axis, such as, for example, a gear, a crown, a plate, etc, is fixed to the external cylinder.

When a bearing is used to carry out the transmission of movement with a multiplier or reduction effect, where the transmission ratio is very high, at least one of the bearings participating in the transmission is subject to high speeds, with a resulting and negative repercussion in the working life of the bearing.

Meanwhile, even though there are bearings or bearing shells in different sizes and with different performances as regards the loads they can support, in practice, there are many situations where it is needed or advisable to coaxially couple more than one bearing shell, in order to avoid overheating effects and improve transmissions, which entails a remarkable complexity in both structural and assembly terms, and which can have a negative effect in terms of costs and maintenance.

(III) SUMMARY OF THE INVENTION

The modular bearing unit described provides a fully satisfactory solution to the two issues mentioned as part of the abovementioned problems, so that the modular unit can produce a reduction effect within the core of the unit, between the first and last bearing operating in the unit, the speed differential being divided among all bearings and each rotating at a much lower speed. On the other hand, the different bearings may be fixed to each other so that they all rotate simultaneously and at the same speed, improving the mechanical resistance of the whole unit.

For such purposes and, more specifically in the unit that is recommended, a plurality of bearing shells (with a variable number) participate, each of which is axially extended in a cylindrical coupling neck to the immediately adjacent bearing, so that the external diameter of the neck corresponds to the internal diameter of the internal ball-race of the adjacent bearing, to which it must be coupled and fixed.

There are two alternatives with this basic structure, either the cylindrical neck joins the external ball-race of its bearing, with a single-part character, where the first of the abovementioned effects shall be achieved; i.e., the reducing effect, or the cylindrical neck joins the internal ball-race of its bearing, where the bearing unit shall act as a single bearing with greater axial dimensions.

The neck can be composed of an external thread to fix the element to the internal ball-race of the adjacent bearing, screwed to fit, or the different modules or bearings can be attached to each other with a simple pressure coupling system. Likewise, the external ball-race can be screwed to facilitate the assembly of any of the common accessories, such as gears, plates, crowns, etc, or it can be flat to couple these elements with pressure-fit systems.

Finally, and in accordance with another of the characteristics of the invention, the above-mentioned neck is intended to be physically independent from the two bearings or bearing shells, so that there are two coaxial necks with substantially different diameters. The one with the smallest diameter is intended to be coupled to the core of a bearing and the one with the greatest diameter is intended to be coupled externally to a different bearing with a pressure-fit, thread or any other system.

Pursuant to the main objective of the invention, if the external ball-race is joined to the axial neck in each bearing with a single-part character, when the axial neck is coupled to a second bearing, the interior ball-race of the latter shall rotate simultaneously as the external ball-race of the first bearing, thus achieving a substantial reduction effect, which is improved as the number of bearings participating in the modular unit increases. Therefore, any reduction effect degree can be achieved between the internal ball-race corresponding to the first bearing and the external ball-race of the last bearing.

(IV) DESCRIPTION OF THE DRAWINGS

In order to provide additional information to the invention described herein and to better understand its features, a set of drawings is included as an integral part of the description, according to a preferred embodiment, with an illustrative and non-limitative character, representing the following:

FIG. 1 is a schematic representation in perspective of a bearing that is part of the modular bearing unit, as described in the purpose of this invention.

FIG. 2 is a diametrical section of the same bearing shown in the previous figure.

FIG. 3 is a set of four bearings, as shown in FIG. 1, duly coupled in a coaxial manner.

FIG. 4 is a diametrical and detailed section of the connecting bush or double neck that enables the coaxial coupling, with a reduction effect between two conventional bearings.

Finally, FIG. 5 is an example of a practical embodiment wherein, on several inter-coupled bearings, there appear gear elements, with their corresponding driving chains.

(V) DETAILED DESCRIPTION OF THE INVENTION

In view of the figures shown above, a plurality of bearings (as many as desired) can participate in the modular bearing unit (1) recommended, each of which is composed of two standard cylinders or internal (2) and external (3) ball-races, establishing the set of balls (4) that facilitate the rotating movement of the ball-race in relation to the next one, but taking into account the special feature consisting in that the bearing (1) extends to a neck (5), preferably equipped with an external thread (6) that is complementary of another thread (7) in an internal or smaller-diameter ball-race (2) of the bearing shell, so that several bearings (1) may be coupled coaxially through the neck (5), as shown on FIG. 3.

The neck (5) may be joined with a single-element character to the ball-race (2) with a smaller diameter, to obtain a bearing with a greater mechanical resistance in this type of coupling but, in accordance with the figures, the neck (5) shall be joined with a single-element character to the external ball-race (3) through a ring-shaped flange (8), as shown in FIG. 2, so that the neck (5) shall act identically for the second bearing (1), as if it were onto the external ball-race (3) of the first bearing (and so on and so forth), achieving the above-referred multiplier or reduction effect, as desired, as taking into account that the external ball-race (3) of each bearing shell makes up a single element with the neck (5) of the bearing shell, when the following bearing shell (1) is fixed to the neck, the external ball-race of the first bearing shell makes up a virtually single element with the internal ball-race of the second bearing shell, through the neck (5) which joins them. In turn, the external ball-race of the second bearing shall have a single-element character with the internal ball-race of the third bearing (and so on and so forth), so that the greater the number of bearings participating in the modular unit, the higher the multiplier or reduction effect attained.

From the abovementioned structure we can deduce that a series of special bearing shells (1) participate in the modular bearing unit recommended, i.e., bearing shells that are manufactured with the aforesaid characteristics and which require a coaxial coupling system. However, the use of conventional bearing shells (1) has also been taken into account, so that the neck (5) shall not form a single-element with the bearing and it shall be part of the modular bushing unit (9), as shown in FIG. 4, establishing two necks; one (10) that is equivalent to the abovementioned neck, used for the same purposes and thus becoming fixed to the core of the next bearing, and a second neck (11), with a much greater diameter, intended to couple and become fixed to the external ball-race (3) of the adjacent bearing.

In any case, in accordance with another characteristic described in the invention, the external surface of the ball-races (3) with the greatest diameter shall also include a thread (12) that facilitates the coupling of the bearing shells or bearing units of the corresponding gears or crown gears (13) which shall transmit the movement to the second shaft (with the same or different characteristics) with chains (14), as shown in FIG. 5.

The invention claimed is:

1. A modular bearing unit comprising a plurality of bearings and bearing shells, wherein each bearing shell incorporates a main body, composed of two coaxial ball-races between which a ball ring, a coaxial neck, an external diameter of which matches an internal diameter of an interior cylindrical ring of the bearing shell, with a threaded surface, is established, so that each bearing shell can be coupled and fixed coaxially to another bearing shell through said threaded surface of said coaxial neck.

2. A modular bearing unit, according to claim 1, wherein the coaxial neck joins the main external cylinder of the main body of each bearing shell, linked to said bearing shell through a ring-shaped flange.

3. A modular bearing unit, according to claim 1 or 2, wherein the internal ball-race of each bearing shell and the external surface of the neck coupling the bearing shells are threaded to fit.

4. A modular bearing unit, according to claim 1, further comprising a modular bushing unit wherein a neck is part of said modular bushing unit composed of two cylindrical necks with different diameters, linked through an intermediate flange, the neck of said modular bushing unit with the smaller diameter being coupled to an internal ball-race of a bearing, while the neck of said modular bushing unit with the greater diameter is coupled to an external ball-race of the adjacent bearing.

5. A modular bearing unit, according to claim 1, 2 or 4, wherein the coupling of each bearing shell neck to the internal ball-race of the adjacent bearing shell or, when applicable, the coupling of the two necks of the bushing to the respective bearings is achieved through pressure-fit insertion or complementary threads.

6. A modular bearing unit, according to claim 1, 2 or 4, wherein the external ball-race of each module or bearing shell and, where applicable, the neck with the greater diameter of the bushing coupling the bearing shells, include their external threaded surface for the coupling of gears, crowns, pulleys or similar transmission elements.

* * * * *